United States Patent [19]

Buyak

[11] Patent Number: 4,628,213

[45] Date of Patent: Dec. 9, 1986

[54] ELECTRONIC CIRCUITS FOR DRIVING BELLS OR ELECTROMAGNETIC DEVICES

[75] Inventor: William P. Buyak, New Hartford, Conn.

[73] Assignee: General Signal Corporation, Stamford, Conn.

[21] Appl. No.: 764,154

[22] Filed: Aug. 9, 1985

[51] Int. Cl.[4] .......................... H02J 17/00; G08B 3/00

[52] U.S. Cl. .......................................... 307/80; 307/43; 307/2; 340/392; 340/84

[58] Field of Search ........................ 340/392, 400, 401; 307/2, 80, 43, 45; 361/160, 206, 209, 247 R, 571, 584

[56] References Cited

U.S. PATENT DOCUMENTS

| | | | |
|---|---|---|---|
| 3,493,966 | 2/1970 | Human | 340/392 X |
| 3,868,683 | 2/1975 | Darrow | 361/206 X |

*Primary Examiner*—William M. Shoop, Jr.
*Assistant Examiner*—Sharon D. Logan
*Attorney, Agent, or Firm*—Robert R. Hubbard; Ronald Reichman

[57] ABSTRACT

A multimode electronic circuit for driving bells or other electromagnetic devices. An important feature of this design is that it allows one circuit to function in a variety of modes: either in the vibrating mode or single stroke mode, both being operative with either an AC or DC source.

5 Claims, 3 Drawing Figures

SWITCH CONTACTS CLOSED (ALL OTHERS OPEN)

| | | | | | | | | | | |
|---|---|---|---|---|---|---|---|---|---|---|
| AC vib | 1 | A | | | | | | | | |
| DC vib | 2 | | B | | E | | | J | | |
| AC s.s. | 3 | | B | | | F | G | | K | L |
| DC s.s. | 4 | | B | C | | F | | | K | L |

ELECTRONIC CIRCUITS FOR DRIVING BELLS OR ELECTROMAGNETIC DEVICES

BACKGROUND OF THE INVENTION

1. Field of the Invention

This invention pertains to the field of electronic circuits for driving bells and the like and more particularly to a circuit that permits driving such devices in a variety of modes of operation.

It has been known to provide electronic circuits that are useful for driving bells or the like. However, the general approach to such driving circuits is to start from scratch in dependence on whether the bells are to be operated in a vibrating mode or in a single stroke mode. Furthermore, the approach has often been different depending on whether the power supply is AC or DC.

Accordingly, a primary object of the present invention is to achieve flexibility in operation such that a circuit, preferably adapted to be mounted on a single printed circuit board, can be effective to operate in a variety of modes as follows: (1) AC/DC "vibrating" and (2) AC/DC "single stroke". If desired, two separate printed circuit boards can be dedicated to each of the above noted combination of modes, that is, either mode 1 or 2.

SUMMARY OF THE INVENTION

The above and other objects and advantages of the invention are fulfilled by the provision of a single electronic circuit that is arranged to switch into or out of the circuit a variety of components that will enable the selection of a particular mode of operation. Thus, when it is required that the bell be driven by an AC source and in a vibrating mode, this is accomplished simply by having a series diode, forming part of the circuit, solely connected to the bell or other electromagnetic means. However, when the bell is to operate in a vibrating mode but with a DC supply, then a local RC oscillator is coupled to a solid state switch, the latter providing nonsparking switching. Operating life in such a mode of operation is limited only by mechanical considerations.

In contrast to the above described AC or DC vibrating mode, when an AC single stroke mode is to be effectuated, the same electronic circuit is synchronized with the AC power supply, or with unfiltered DC power, to produce consistent strokes of maximum acoustic output. Power or energy is conserved by automatically turning the bell, or other device, off at the end of each "stroke cycle". On the other hand, the DC single stroke mode is effectuated when a system is to be operated on semifiltered or smooth DC. Again, energy is conserved by automatic turnoff of the bell at the end of each "stroke cycle". Such feature is especially important for battery powered installations.

In any of the modes already discussed, the voltage that is typically selected for operation is between 6 volts and 240 volts. However, other voltages are possible.

Other and further objects, advantages and features of the present invention will be understood by reference to the following specification in conjunction with the annexed drawing, wherein like parts have been given like numbers.

DESCRIPTION OF PREFERRED EMBODIMENT

Figure 1:
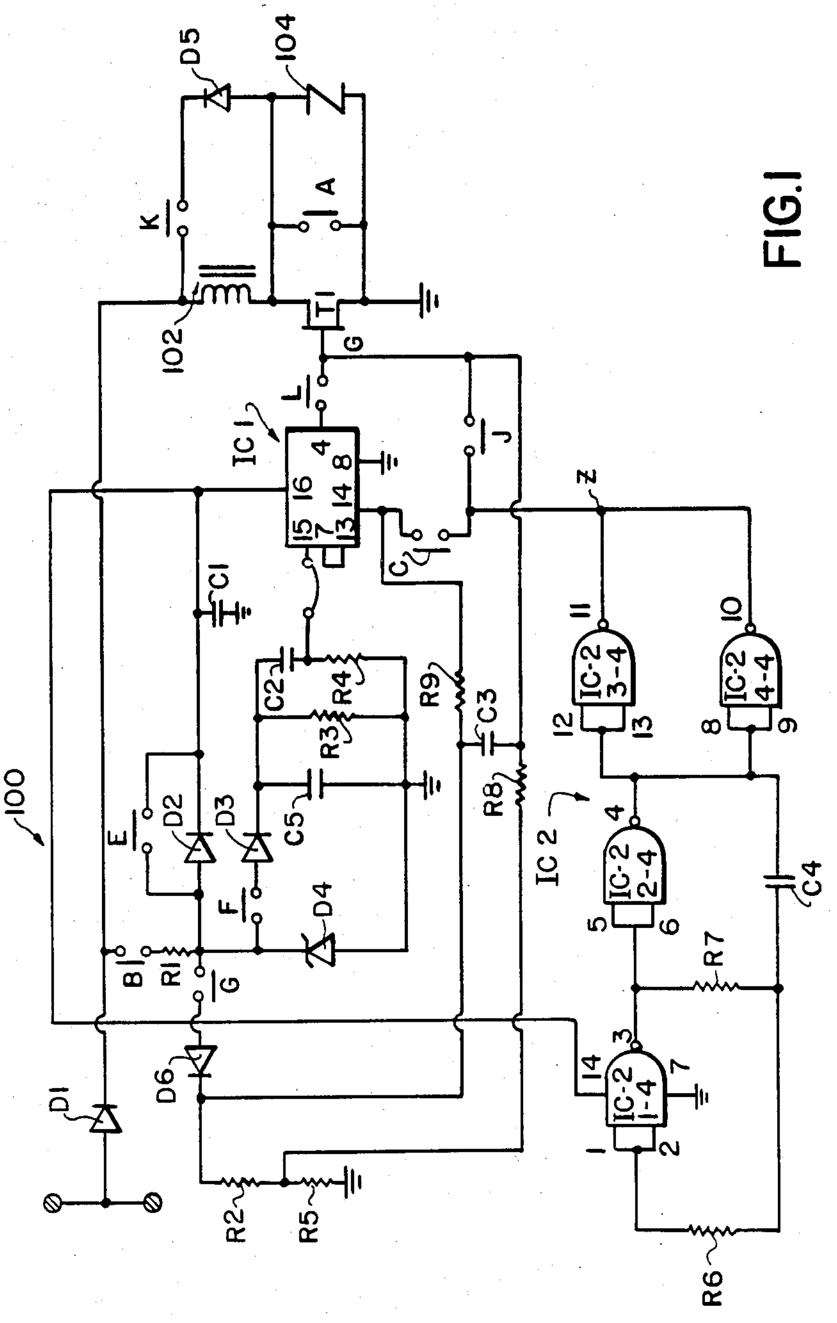
FIG. 1 is a schematic diagram of an electronic circuit for driving bells or the like in accordance with a preferred embodiment of the present invention.

Referring now to the figures of the drawing and in particular, for the moment, to FIG. 1, there is illustrated an electronic circuit 100 for driving bells or the like in a variety of modes. In a first mode of operation, which is a vibrating mode involving an AC source, the arrangement is such that the AC power supply, represented schematically by the symbols + and −, is applied to a series circuit consisting only of the diode D1 and the bell coil or coils 102. In this situation, the switch contacts A, shown across a power MOS-FET designated T1, are closed while all other switch contacts B, C, E, F, G, J, K, and L are open.

It will be noted that a protective device 104 is also connected across switch contacts A such that this device, as well as T1, is ineffective during the AC vibrating mode. Since its function is to limit inductive voltages to safe values with respect to the voltage ratings of transistor T1, it is only required in the circuit during T1's use. The protective device 104 is chosen to become conductive at 90% of T1's voltage rating.

It will be appreciated by those skilled in the art that since primary switch contacts B, C and J are in the open position or state, none of the components to be described, other than D1 and coil 102, are connected in the circuit during the AC vibrating mode.

With reference to the second, or DC vibrating, mode of operation, the diode D1 serves as a disconnect diode for supervised systems and in addition it assures that correct polarity will always be applied to the circuit. The resistor R1 provides a means of limiting the current through zener diode D4 (12 volt nominal). In conjunction with capacitor C1, which acts as a filter capacitor, R1 forms a simple power supply for integrated circuit IC2 to be discussed.

It will be understood that in the DC vibrating mode, the aforenoted diode D4 and resistor R1 are directly connected in series, with capacitor C1 being connected in shunt with D4. This is a consequence of switch contacts B & E being closed, the latter acting to short out diode D2.

The integrated circuit IC2 comprises four separate stages as indicated in FIG. 1 and, in conjunction with resistor R6, seen at the input to the first stage; resistor R7, at the input to the second stage; and capacitor C4, forms an astable multivibrator type of oscillator. Its output wave form, at point Z is a square wave of approximately 50% duty cycle and with a nominal frequency of 55 Hz. The resistor R6 stabilizes the frequency of oscillation as a function of power supply variation. Resistor R7 and capacitor C4 determine the frequency of oscillation in accordance with the approximate formula $F=1/2.2\ R7\ C4$.

The transistor T1 is a solid state (MOS FET) voltage control switch driven directly by IC2 when the circuit is operating in the DC vibrating mode. This is because switch J is closed at this time. When IC2 is at a logical 1, transistor T1 is placed in a conductive state (switch closed). When IC2 is at a logical zero state, T1 is rendered non-conductive (switch open). This effective switching action occurs approximately 55 times per second in this case, it being understood that any other rate is possible.

Turning now to the third or "AC single stroke" mode of operation, it should first be understood that in this mode certain diodes and networks, seen in FIG. 1, are also connected in the circuit, whereas they were not connected in the AC vibrating or DC vibrating modes. The diodes D2 and D3 are so connected by reason of the fact that switch E is now open and switch F is closed. Switch contact B remain closed. In operation, these diodes disconnect from the Zener diode D4 whenever the voltage across D4 is less than the stored voltage on C1 and C5. This action allows the voltage across D4 to vary between the logical "0" and a logical "1", thereby creating a clock signal for IC1.

Also connected in the circuit by closure of switch F, is a network comprising capacitor C5, resistor R3, capacitor C2, and resistor R4. From the junction between capacitor C2 and R4 connection is made to the input at pin 15 of IC1, which functions as a counter. A jumper connection is made from pin 7 to pin 13 of IC1. It is especially convenient to provide this voltage dividing arrangement involving R4. Additionally, R3 is provided to enable a discharge path for capacitor C2 and C5.

IC1 is a decoded electronic counter with a reset and clock inhibit feature. When power is applied, a momentary logical "1" appears across resistor R4 during the charging of capacitor C2, which is applied to pin 15 of IC1 and effects a reset of counter IC1. In operation of this counter, the first clock pulse advances the counter and allows time for the circuits to reach operating voltage. The second clock pulse causes a logical "1" to appear at pin 4, thereby driving T1 into a conductive state, energizing the bell coil and striking the gong. The third clock pulse causes a logical "0" to appear at pin 4 of IC1, thereby driving transistor T1 into an "off" state, thus deenergizing the bell coil 102. At the same time, a logical "1" appears on pin 7 of IC1 and being wired to pin 13 (clock inhibit), prevents any further changes of state.

It will be understood that diode D5, which is connected in circuit, in this AC single stroke mode, by closure of switch contacts K, becomes conductive during the inductive kick of the bell coil and helps sustain coil current, which alternately causes an increase in gong volume. Also, IC1 is connected to the gate of T1 by closure of switch contacts L.

It will also be noted that in this "AC single stroke" mode, or mode 3, connection is made, by closure of switch contacts G, from the junction of resistor R1 and diode D2 through a network, comprising D6, R2, R5, R8, R9, and C3, to pins 4 and 14 of IC1. The R2 resistor provides a means for assuring the logical "0" state. The resistor R5 furnished in the network together with capacitor C3, which is connected between the pins 8 and 14 of IC1, acts to prevent spurious clock signals from reaching IC1.

Circuit operation for "DC single stroke" (the fourth mode) is the same as described for "AC single stroke", except that the oscillator IC2 must be included in the circuit and appropriately connected by closure of contacts C, while contacts G are open to exclude the network D6 et al.

Figures 2A, 2B:
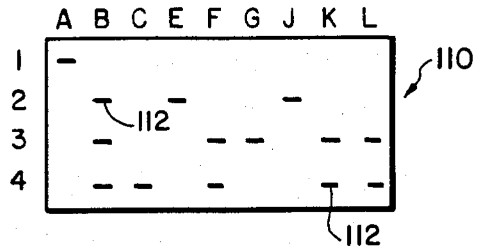
FIG. 2A is a block diagram illustrating a switching means, adapted to close selectively a number of contacts in a ganged switch arrangement, which switching means is incorporated in the electronic circuit of FIG. 1.
FIG. 2B is a corresponding table illustrating the various switch contact states for the four different positions of the switching means of FIG. 2A.

Referring now to FIGS. 2A and 2B, it will be appreciated that a ganged switch arrangement is provided to achieve selectively the four different modes of operation that are desired. Thus, a switch actuator 110, which can take the form of a slidable plate mechanism, enables the movement of predetermined sets of bridging contacts, represented by lines 112, thereby to selectively close pairs of switch contacts A, B, C, E, F, G, J, K, and L.

Recapitulating the four modes of operation that have been described heretofore, the fact that only the A switch contacts are closed in the first switch position (FIG. 2B) means that only the simple series connection of D1 with the bell coil 102 is effectuated, the transistor T1 and protective device 114 being shorted out because of the closing of switch contacts A.

In switch position 2 the switch contacts B, E, and J are closed (all others being open). As a consequence transistor T1 is in the circuit, as is resistor R1, capacitor C1, and diode D4; capacitor C1 being connected in shunt with D4. Also oscillator circuit IC2 is now directly connected to transistor T1 because of the closure of switch contacts J. However, diode D2 is shorted out because of the closing of contacts E.

In the third switch position, which is effective to produce AC single stroke operation, switch contacts B and F are close such that D2 is now in circuit and the entire network of D3, C5, R3, C2, R4, and IC1, the latter having its output connected to the input of transistor T1. All of these elements are incircuit because of the closure of contacts F. Additionally, because of contacts G being closed, the network comprising diode D6 et al is connected in circuit; and diode D5 is in shunt with the bell coil 102 due to closed contacts K. As noted previously, D5 becomes conductive during the inductive kick of the bell coil and helps sustain coil current which ultimately causes an increase in bell volume. Additionally, contacts L are closed.

However, in the DC single stroke mode, the G contacts are open; but because the oscillator IC2 must be included in the circuit, the switch contacts C are now closed. Similarly to the AC single stroke operation, the contacts B, F, K, and L are also closed.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

I claim:

1. An electronic circuit for driving a bell or the like comprising:

- a first source of AC and DC power;
- a first diode and a coil connected in series to said power source;
- a second power source, including a first resistor and a second diode connectible in series with said first diode, and a filter capacitor in shunt with said second diode;
- a solid state switch connectible to said coil;

an oscillator connectible between (a) the junction of said first resistor and said second diode, and (b) an input of said solid state switch;

a counter connectible to an input of said solid state switch;

a first network connectible to a first input of said counter;

a second network connectible from said junction to a second input of said counter and to said input of said solid state switch;

switching means having a plurality of movable contacts and associated fixed contacts;

said switching means being operative to establish a first, second, third, and fourth modes of operation for said current, whereby in a first position of said switching means the first diode and coil are connected alone in series with said AC power;

in a second position of said switching means, DC power is connected, said solid state switch is connected in series with said first diode and said coil, and said second power source is connected to an input of said oscillator, the output of said oscillator being connected to said input of said solid state switch;

in a third position, AC power is connected, said counter has its output connected to said input of said solid state switch, said first network is connected from said junction of said first resistor and said second diode to an input of said counter, and said second network is connected from said junction to another input of said counter, as well as to said input of said solid state switch;

and in a fourth position of said switching means, DC power is again connected, said oscillator is connected to another input of said counter and said second network is disconnected therefrom.

2. A circuit as defined in claim 1, in which said switching means includes at least eight pairs of fixed contacts and corresponding movable contacts for the respective pairs.

3. A circuit as defined in claim 1, in which said second diode is connected from one end of said first resistor to ground, said first diode being connected to the other end of said first resistor in said modes of operation other than said first.

4. A circuit as defined in claim 1, in which said first network includes a third diode series connected with (a) a first capacitor; (b) a second resistor; and (c) a second capacitor and third resistor in series; the elements (a), (b), and (c) being in parallel with each other.

5. A circuit as defined in claim 4, in which said second network includes (d) fourth and fifth resistors connected in series to ground; (e) a third capacitor, and sixth and seventh resistors connected across said fourth resistor, and to an input and to the output of such counter.

* * * * *